US007762623B2

(12) United States Patent
De Jong

(10) Patent No.: US 7,762,623 B2
(45) Date of Patent: Jul. 27, 2010

(54) VEHICLE ROOF WITH AT LEAST TWO COVER ELEMENTS

(75) Inventor: Chris De Jong, Zwolle (NL)

(73) Assignee: Webasto AG, Stockdorf (DE)

( * ) Notice: Subject to any disclaimer, the term of this patent is extended or adjusted under 35 U.S.C. 154(b) by 69 days.

(21) Appl. No.: 12/066,295

(22) PCT Filed: Sep. 8, 2006

(86) PCT No.: PCT/DE2006/001587

§ 371 (c)(1),
(2), (4) Date: Jun. 20, 2008

(87) PCT Pub. No.: WO2007/028377

PCT Pub. Date: Mar. 15, 2007

(65) Prior Publication Data

US 2008/0252106 A1    Oct. 16, 2008

(30) Foreign Application Priority Data

Sep. 9, 2005   (DE) ........................ 10 2005 043 019

(51) Int. Cl.
*B60J 7/05* (2006.01)
(52) U.S. Cl. ...................................... 296/221; 296/217
(58) Field of Classification Search .................. 296/217, 296/221, 222, 216.02
See application file for complete search history.

(56) References Cited

U.S. PATENT DOCUMENTS 4,609,222 A * 9/1986 Boots .......................... 296/218
4,684,168 A * 8/1987 Lupo .......................... 296/217
5,601,330 A * 2/1997 Ulbrich et al. ............... 296/217
5,941,598 A    8/1999 Cave et al.

FOREIGN PATENT DOCUMENTS

| DE | 1946161 | 3/1971 |
| DE | 35 22 781 | 10/1986 |
| DE | 100 62 156 | 6/2002 |
| EP | 0 727 331 | 8/1996 |

* cited by examiner

*Primary Examiner*—Dennis H Pedder
(74) *Attorney, Agent, or Firm*—Fitch, Even, Tabin & Flannery; John M. Naber

(57) ABSTRACT

The invention relates to a vehicle roof with two cover elements (14, 16), a front one of which can be deployed and a rear one of which serves as the sliding cover, can be lowered under the stationary vehicle roof and displaced. An embodiment of the invention relates to an actuating mechanism of a drive slide which interacts with a deployment lever in order to swivel the front cover element (14), said lever being hinged to a support of the front cover element (14). The deployment movement of the deployment lever is supported by a spring. According to another aspect of the invention, the actuating mechanism comprises a slide unit which comprises one control track each for the front cover element (14) and for the rear cover element (16). The control tracks are configured in such a manner that the displacement of the slide unit in the direction of the vehicle roof, starting from a closed position of both cover elements (14, 16), first results in both cover elements (14, 16) being deployed, a continuous displacement of the slide unit in the same direction results in the rear cover element (16) being swung back and lowered and in the rear cover element (16) being retracted.

10 Claims, 15 Drawing Sheets

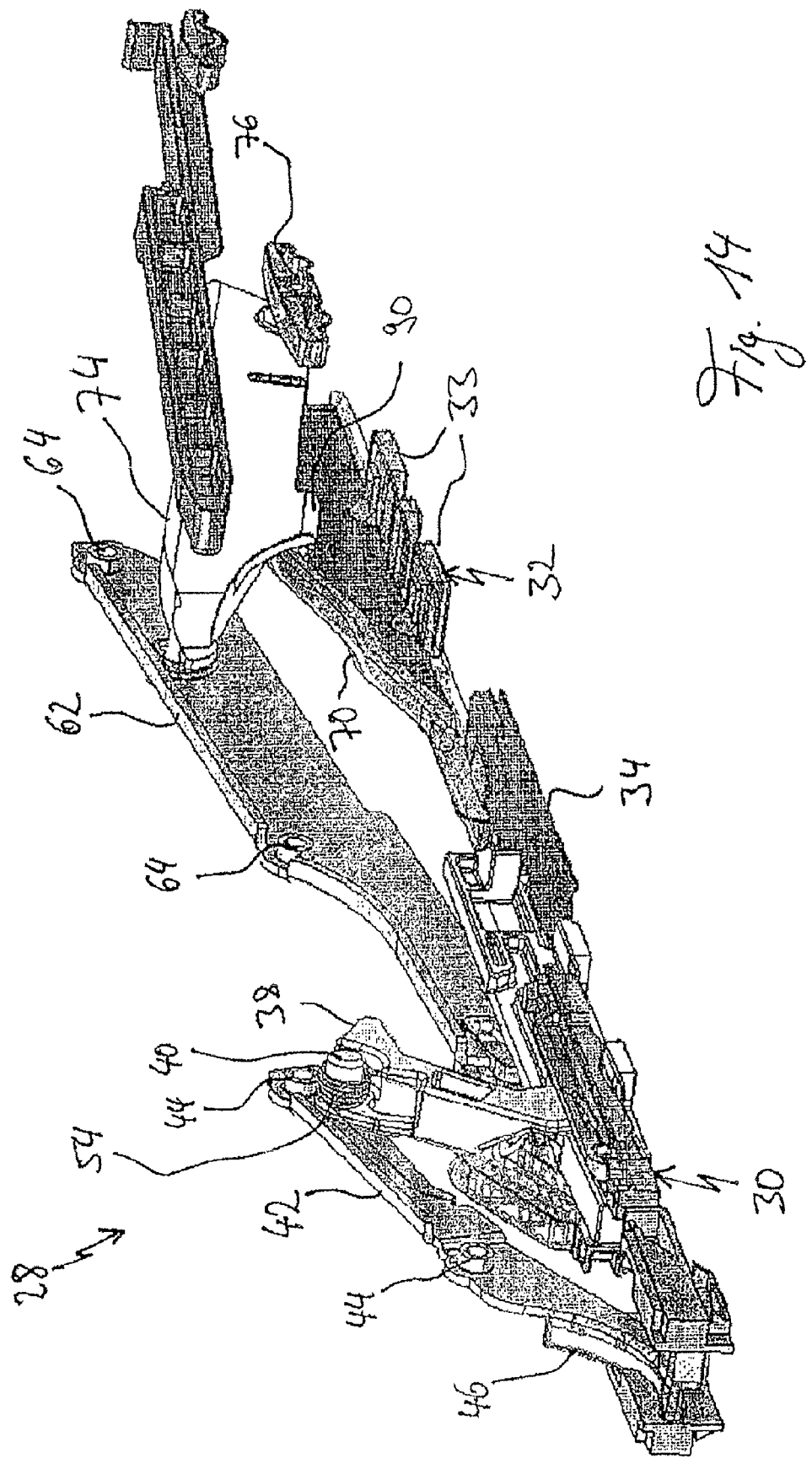

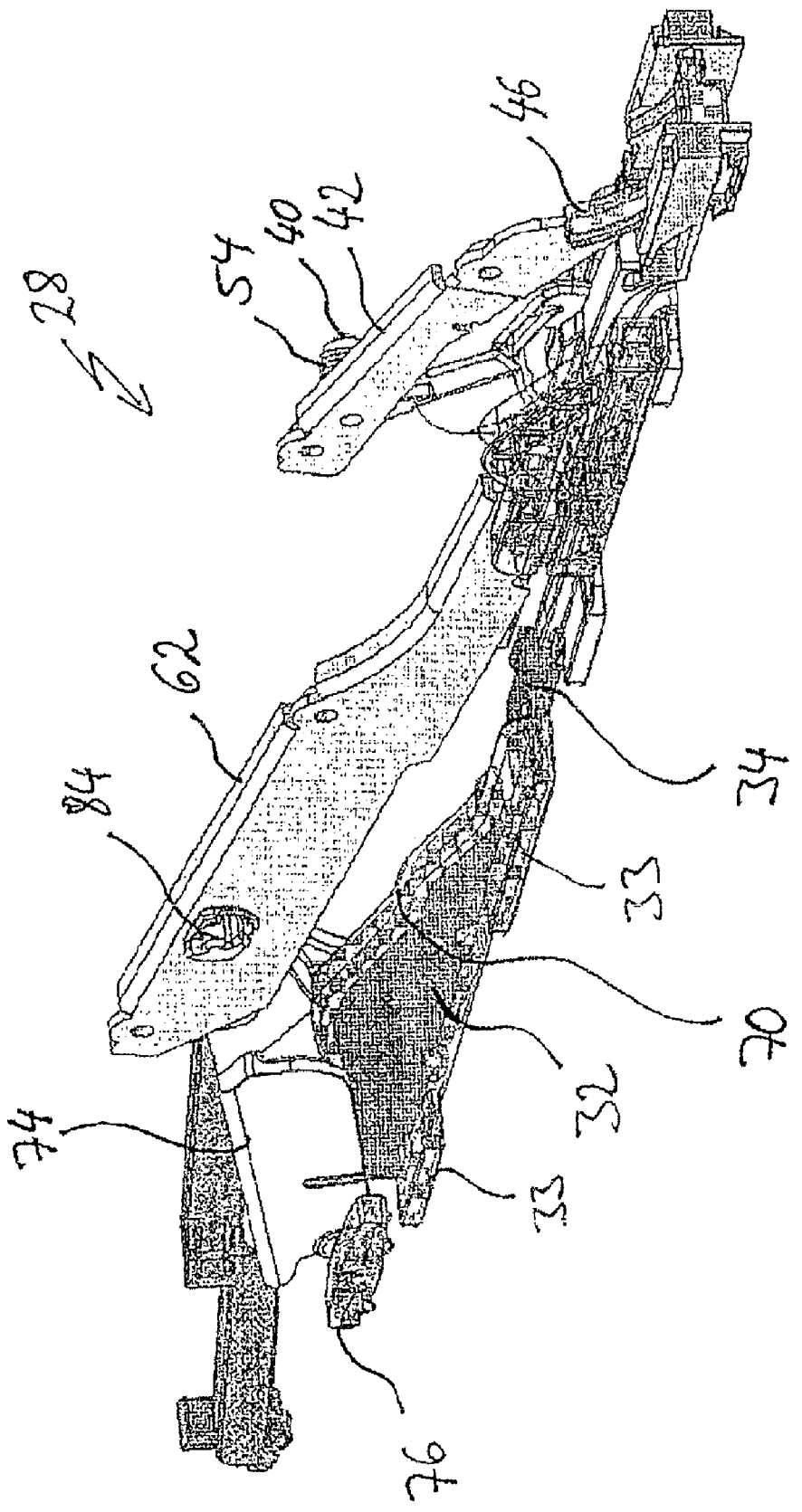

VEHICLE ROOF WITH AT LEAST TWO COVER ELEMENTS

This application is a 35 U.S.C. §371 National Stage entry of PCT/DE2006/001587, filed Sep. 8, 2006, which claims priority from German Patent Application No.: DE 10 2005 043 019.8, filed Sep. 9, 2005, the contents of which are herein incorporated by reference.

The invention relates to a vehicle roof with at least two cover elements which optionally close or at least partially open up a roof opening, according to the precharacterizing clause of patent claim 1 and of patent claim 8.

A vehicle roof of this type is known from EP 0 727 331 B1. In this vehicle roof, the front cover element serves as a wind deflector and the rear cover element serves as a sliding cover. The front cover element can be deployed with its rear edge above a fixed vehicle roof region. The rear cover element can be lowered under the fixed vehicle roof region and can be displaced along guide rails which are arranged on both sides of the roof opening and are fixed on the roof. In order to realize the various operating positions of the two cover elements, an actuating mechanism which jointly drives the two cover elements is provided.

Furthermore, a vehicle roof of the generic type mentioned in the introduction and having a front and a rear cover element is known from DE 35 22 781 A1, in which the front cover element is prestressed in the deployment direction by means of a spring provided in the region of the pivot axis and said cover element can be lowered by a pressure exerted by a sliding element for the rear cover element. In the case of a design of this type, the spring has to be of strong design in order to be able to sufficiently counter strong wind forces. However, this has a disadvantageous effect for the closing of the front cover element, since high driving forces which counter the spring force are required.

The invention is based on the object of providing a vehicle roof of the generic type mentioned in the introduction, which is provided with a robust and compact driving mechanism for the two cover elements.

This object is achieved according to the invention by the vehicle roof with the features of patent claim 1 and by the vehicle roof with the features of patent claim 8.

The invention therefore relates to a vehicle roof with at least two cover elements which optionally close or at least partially open up a roof opening, of which a front cover element can be deployed with its rear edge above a fixed vehicle roof region and of which a rear cover element serves as a sliding cover and can be lowered under the fixed vehicle roof region and can be displaced along guide rails which are arranged on both sides of the roof opening and are fixed on the roof. An actuating mechanism for the two cover elements is designed in such a manner that it comprises for each guide rail a driving slide which is provided with a control track which interacts with a deployment lever for the front cover element, the deployment lever being coupled to a pivotable support of the front cover element. The deployment movement of the deployment lever is assisted by means of a spring. A robust mounting of the front cover element is made possible by the deployment movement being controlled by means of the driving slide and the deployment movement being assisted by the spring. In addition, the spring secures the front cover element in the deployed position. The mechanical prop formed by the deployment lever can also withstand high wind forces.

In a special embodiment, the deployment lever, of which one end is coupled to the support of the front cover element, is mounted with its other end in a displaceable and rotatable manner in the region of the guide rail. Starting from an essentially horizontal arrangement of the deployment lever, in which the front cover element is in the closed position, a displacement of the end mounted in the region of the guide rail causes the deployment lever to be set upright and therefore causes the front cover element to be deployed.

The spring preferably acts in such a manner that the deployment movement of the deployment lever, i.e. the displacement of the one end of the deployment lever in the guide rail, is assisted. In this case, one leg of the spring preferably acts on the support of the cover element and a further leg of the spring preferably acts on the deployment lever. The spring therefore assists an expansion of the deployment lever and of the pivotable support of the front cover element.

The spring can be designed as a spiral spring which, in particular, is mounted on a peg forming a joint between the support and the deployment lever.

In order to minimize the risk of tilting of the deployment lever during its deployment movement, said deployment lever is preferably guided via at least one guide pin or guide peg in a guide track fixed on the guide rails.

An inadvertent deployment of the front cover element can be prevented in an advantageous manner if the deployment lever is provided with a securing peg which, in the closed position of the front cover element, engages in a recess of the driving slide in such a manner that it bears against an upper wall of the driving slide.

In order to be able to pivot up the front cover element in an as resistant-free a manner as possible without collision with a front border of the roof opening, it is expedient to displace said cover element slightly in the direction of the vehicle rear during its pivoting-out movement. In order to make this possible, the support of the front cover element is advantageously formed in the region of its front end with a rotary bearing tongue. The latter can be provided with a plastic encapsulation by injection molding, by means of which the frictional forces are minimized during the displacement of the front cover element. The offsetting of the front cover element can take place by a pulling of the driving slide at the securing peg of the deployment lever.

A particularly stable embodiment of the vehicle roof according to the invention can be achieved if the deployment lever for the front cover element is of essentially U-shape design and the driving slide can be displaced between two limbs of the deployment lever.

The invention furthermore relates to a vehicle roof of the generic type mentioned in the introduction, in which the actuating mechanism for each guide rail in each case comprises a slide unit which comprises a respective control track for the front cover element and the rear cover element, the control tracks being designed in such a manner that, starting from a closed position of the two cover elements, a displacement of the slide units in the direction of the vehicle rear firstly causes the two cover elements to be pivoted out into a ventilation position, a further displacement of the slide units in the direction of the vehicle rear causes the rear cover element to be pivoted back and lowered, and then causes the rear cover element to be pulled back under a rear roof skin section.

A roof system is therefore provided which has two cover elements which can be brought jointly into a ventilation position, which has a favorable effect on the supply of air to the vehicle interior. Both cover elements are actuated by means of the same slide units.

The movement of the rear cover element is preferably controlled in such a manner that, for the pivoting of the rear cover element, the control track assigned to said cover element interacts with a lifting and lowering lever which acts on the rear cover element.

The lifting and lowering lever can be designed in such a manner that it is guided pivotably with one end in a guide track of the relevant guide rail and acts with its other end on the rear cover element. The control track of the slide unit acts between the two ends.

In order to reinforce the pivoting movement of the lifting and lowering lever for the rear cover element and therefore to increase the adjustment magnitude of the rear cover element, a reinforcing lever can be provided on which the lifting and lowering lever acts and which is guided with one end in a guide track of the guide rail and acts on the rear cover element with its other end. In particular, it can act on a pivotable support of the rear cover element.

In order to limit and define the maximum degree of deployment of the rear cover element, a stop for the reinforcing lever can be formed on the lifting and lowering lever. As an alternative, a stop for the lifting and lowering lever can also be provided in an analogous manner on the reinforcing lever.

In order to separate the actuating mechanism for the front cover element and for the rear cover element in terms of components, the closing units can each comprise a front driving slide which interacts with the front cover element, and a rear driving slide which interacts with the lifting and lowering lever for the rear cover element.

In order to realize a connection which is as rigid as possible between the two driving slides of the slide unit, the two driving slides can be connected to each other via a driving cable plate on which a compression-resistant driving cable is fixed. The latter is connected in turn to a conventional driving motor, for example arranged to the rear of the roof opening. The driving cable plate can be provided with a guide section which is guided in a guide track of the associated guide rail.

For the pivoting operation, the rear support can be mounted at its front end via a pivot peg in a guide rail insert which defines a pivot axis, can be formed from an injection molded plastic part and at the same time can have a slotted guide track for the above-described stabilizing peg of the front deployment lever.

The front driving slide can be designed, in particular, in such a manner that it has a slotted guide track which serves for the lowering of a front end of the support of the rear cover element. A lowering of the front border of the cover element may namely be required in order to be able to release the pivot pegs of the supports of the rear cover element and to be able to displace the rear cover element under a rear roof skin. In the pivoted position, the support is namely expediently fixed in a rotatable manner at its front end. In order to displace the rear cover element, the support is released by lowering of its front end.

The deployment mechanism for the front cover element or the driving slide for the front cover element can otherwise be designed in the manner described above.

Further advantages and advantageous refinements of the subject matter according to the invention can be gathered from the description, the drawing and the patent claims.

Two exemplary embodiments of the subject matter according to the invention are illustrated schematically in simplified form in the drawings and are explained in more detail in the description below. In the drawing FIG. 1 shows a perspective plan view of a vehicle roof with two cover elements in the closed position;

FIG. 14 shows a perspective illustration of an alternative embodiment of an actuating mechanism for the two cover elements; and FIG. 15 shows a further perspective illustration of the actuating mechanism illustrated in FIG. 14.

Figure 1:
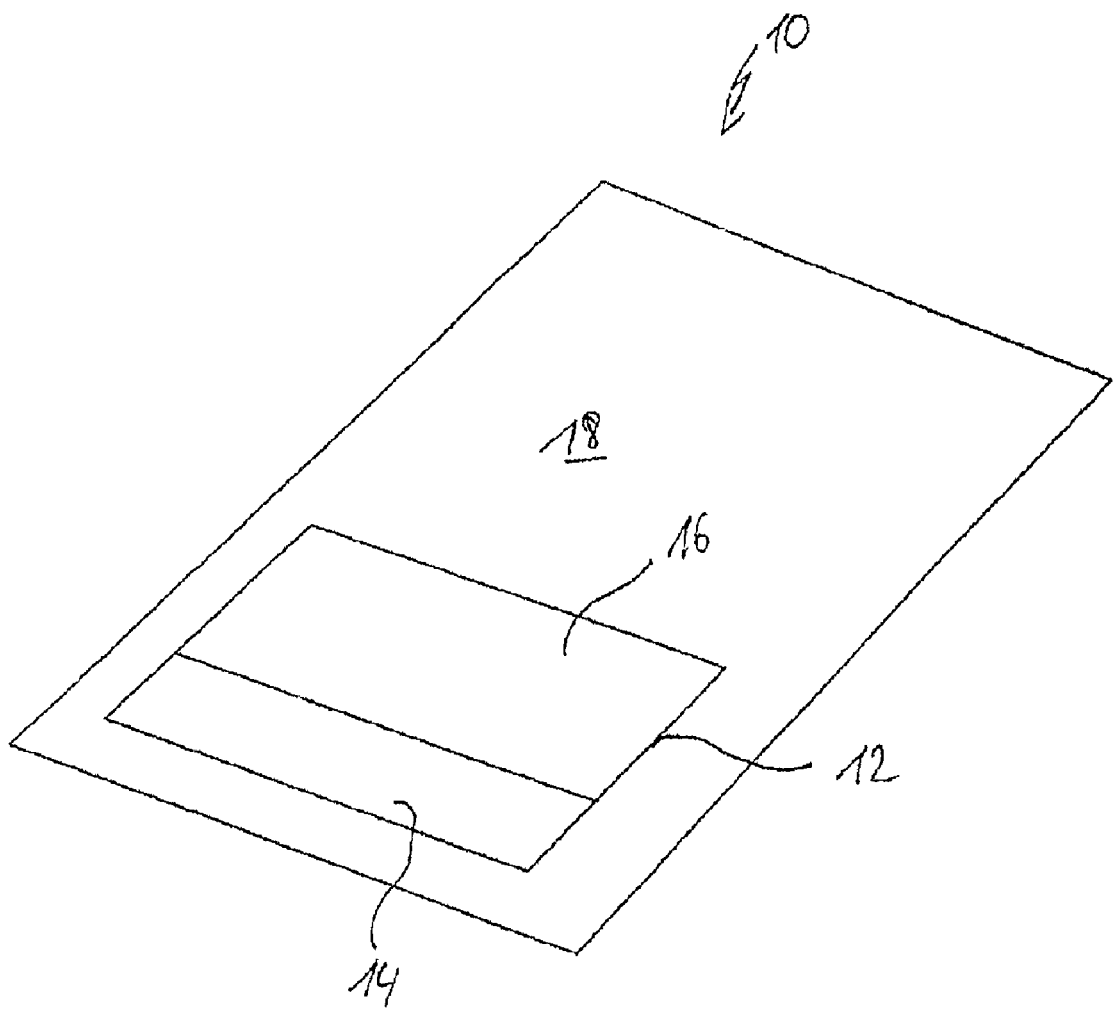
Figure 2:
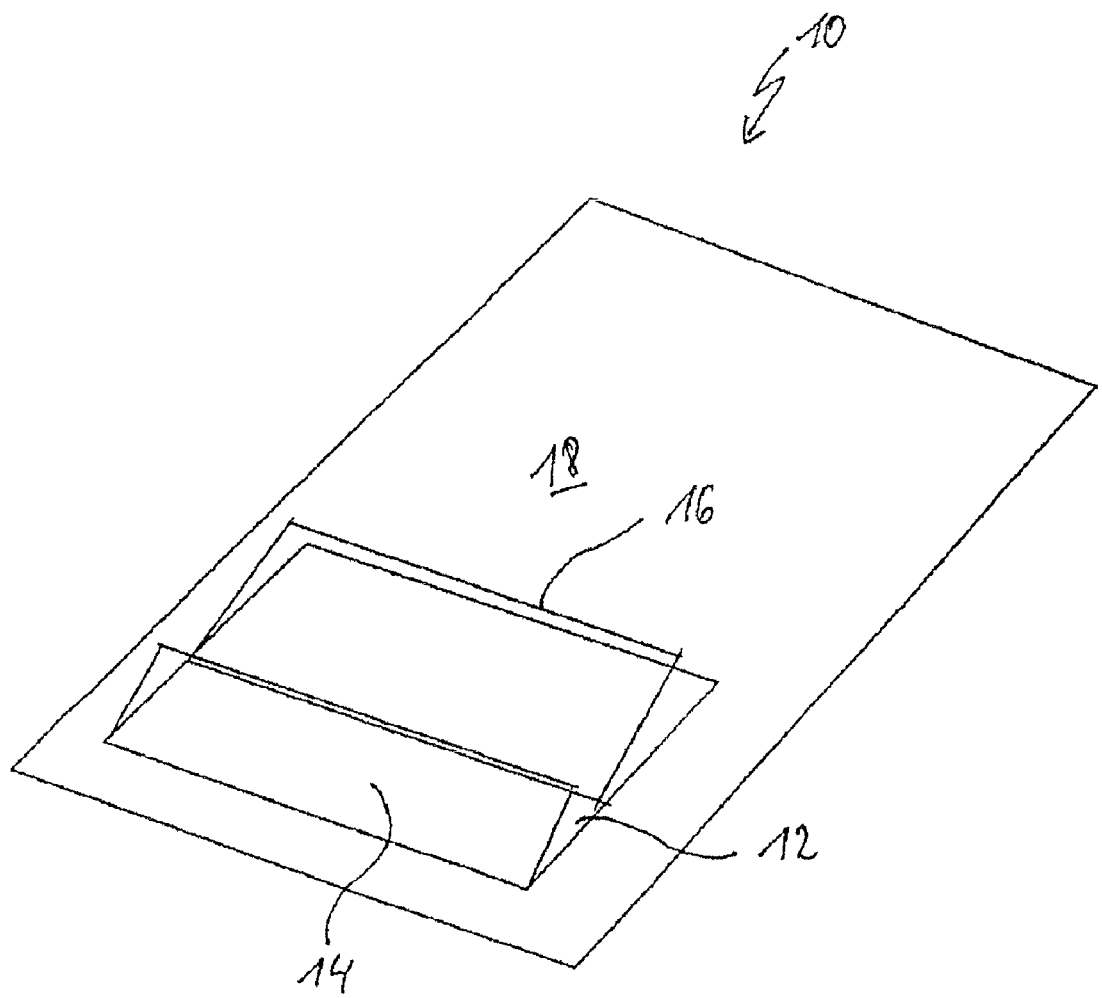
FIG. 2 shows the two cover elements in the ventilation position.
Figure 3:
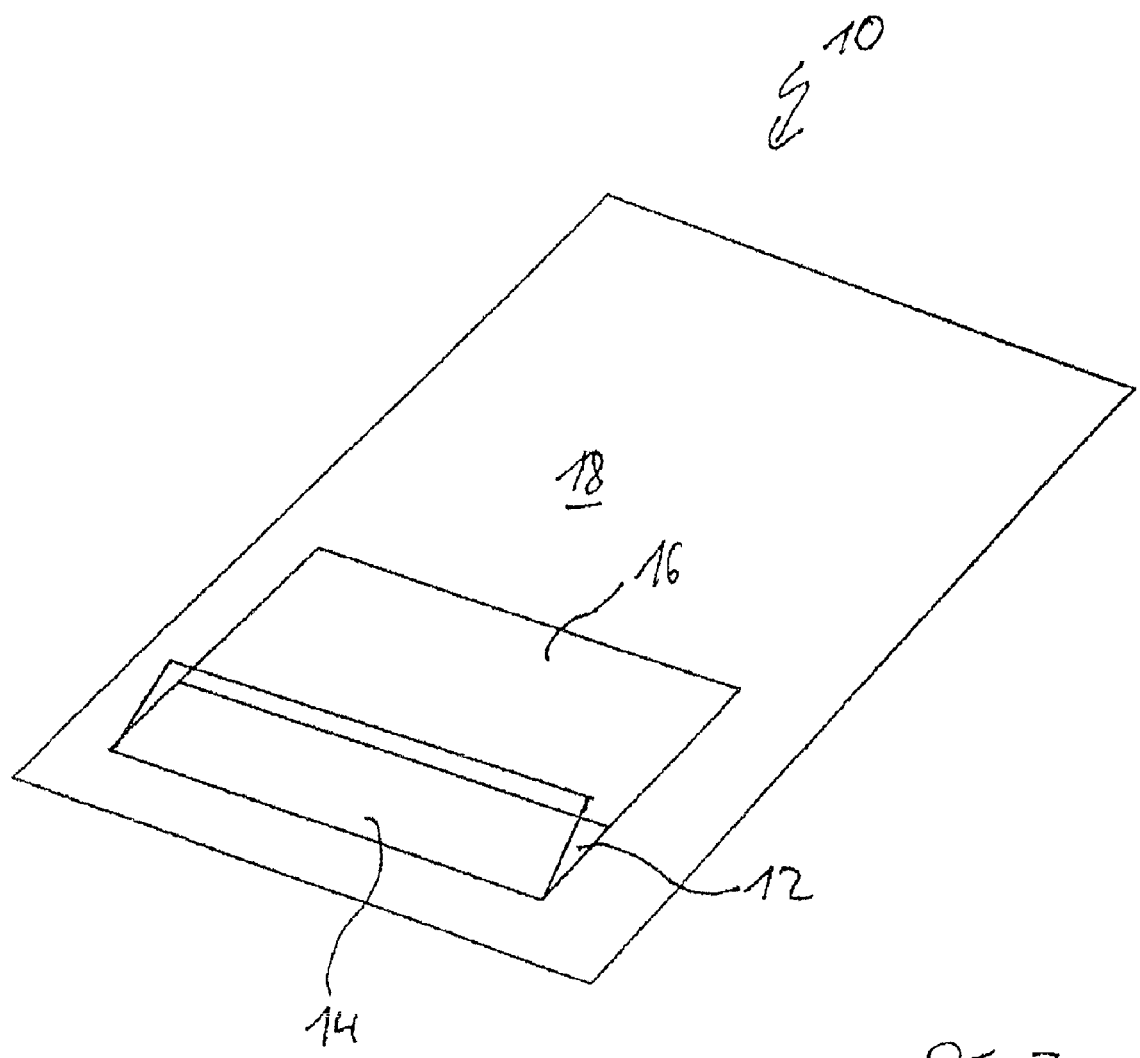
FIG. 3 shows one cover element in the ventilation position and the other cover element in the closed position.

The drawing illustrates a vehicle roof 10 which is provided with a roof opening 12 which can optionally be closed or at least partially opened up by means of a cover element 14 which is in front in the direction of travel and a cover element 16 which is at the rear in the direction of travel. The two cover elements 14 and 16 can take up different positions. Starting from the closed position of the two cover elements 14 and 16 that is illustrated in FIG. 1, an arrangement of the two cover elements 14, 16 can be realized, in which the two cover elements 14, 16 are deployed and consequently take up a "ventilation position". This ventilation position, which is also called twin-vent position, is illustrated in FIG. 2. Furthermore, an arrangement can be realized, in which only the front cover element 14 is deployed and is therefore in the ventilation position, whereas the rear cover element 16 is closed. This arrangement of the cover elements 14, 16 can be seen in FIG. 3.

Figure 4:
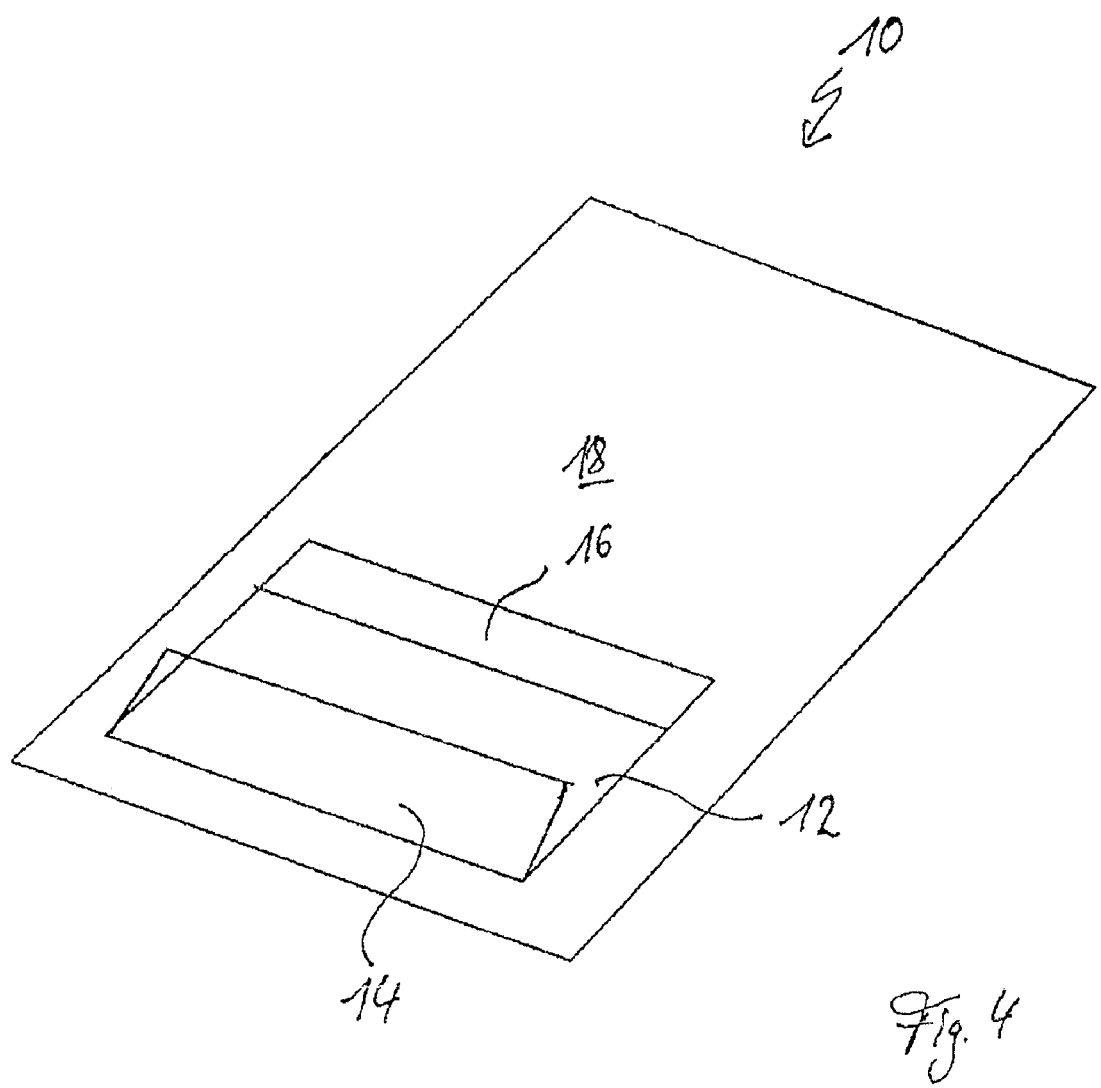
FIG. 4 shows one cover element in the deployed position and the other cover element in the state in which it is moved back.
Figure 5:
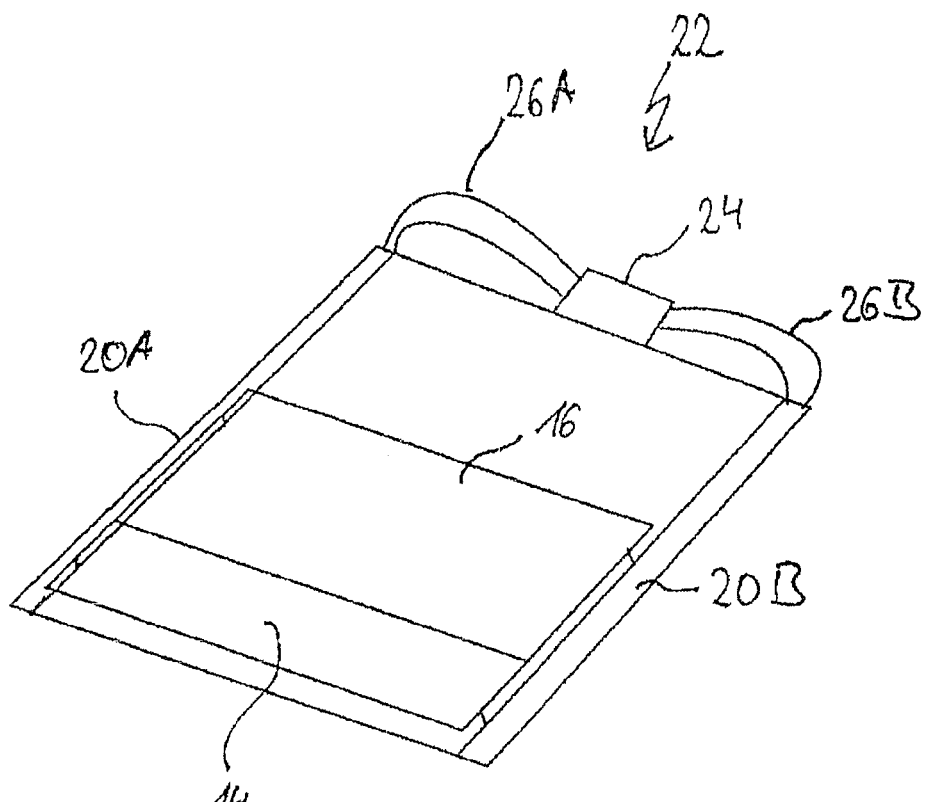
FIG. 5 shows a built-in cassette comprising the two cover elements and a drive.

As can be seen in particular from FIG. 4, the rear cover element 16 also constitutes a sliding cover which can be displaced under a roof skin region 18 arranged to the rear of the roof opening 12. In this position of the rear cover element 16, the front cover element 14 is deployed, and it therefore forms a wind deflector element or a wind deflector slat.

For the mounting of the two cover elements 14 and 16 and for the guidance of the rear cover element 16 during its movement in the longitudinal direction of the vehicle, the vehicle roof has two guide rails 20A, 20B which are arranged on both sides of the roof opening 12 and are part of a roof cassette 22 which can be inserted retrospectively into a vehicle roof as a constructional unit.

In order to actuate the cover elements 14, 16, each guide rail 20A and 20B is respectively assigned an actuating mechanism which can be driven by means of an electric motor 24 which is arranged on the rear border of the roof cassette 22 and acts on two compression-resistant driving cables 26A, 26B. The driving cable 26A acts on the actuating mechanism which is guided in the guide rail 20A, and the driving cable 26B acts on the actuating mechanism which is guided in the guide rail 20B.

The actuating mechanisms which are guided in the two guide rails 20A and 20B are of mirror-symmetrical design with respect to the longitudinal centre plane of the vehicle, and therefore only the actuating mechanism guided in the guide rail 20B arranged on the left in the direction of travel is referred to below, said actuating mechanism being illustrated in detail in FIGS. 6 to 13 and being provided with the reference number 28.

Figure 8:
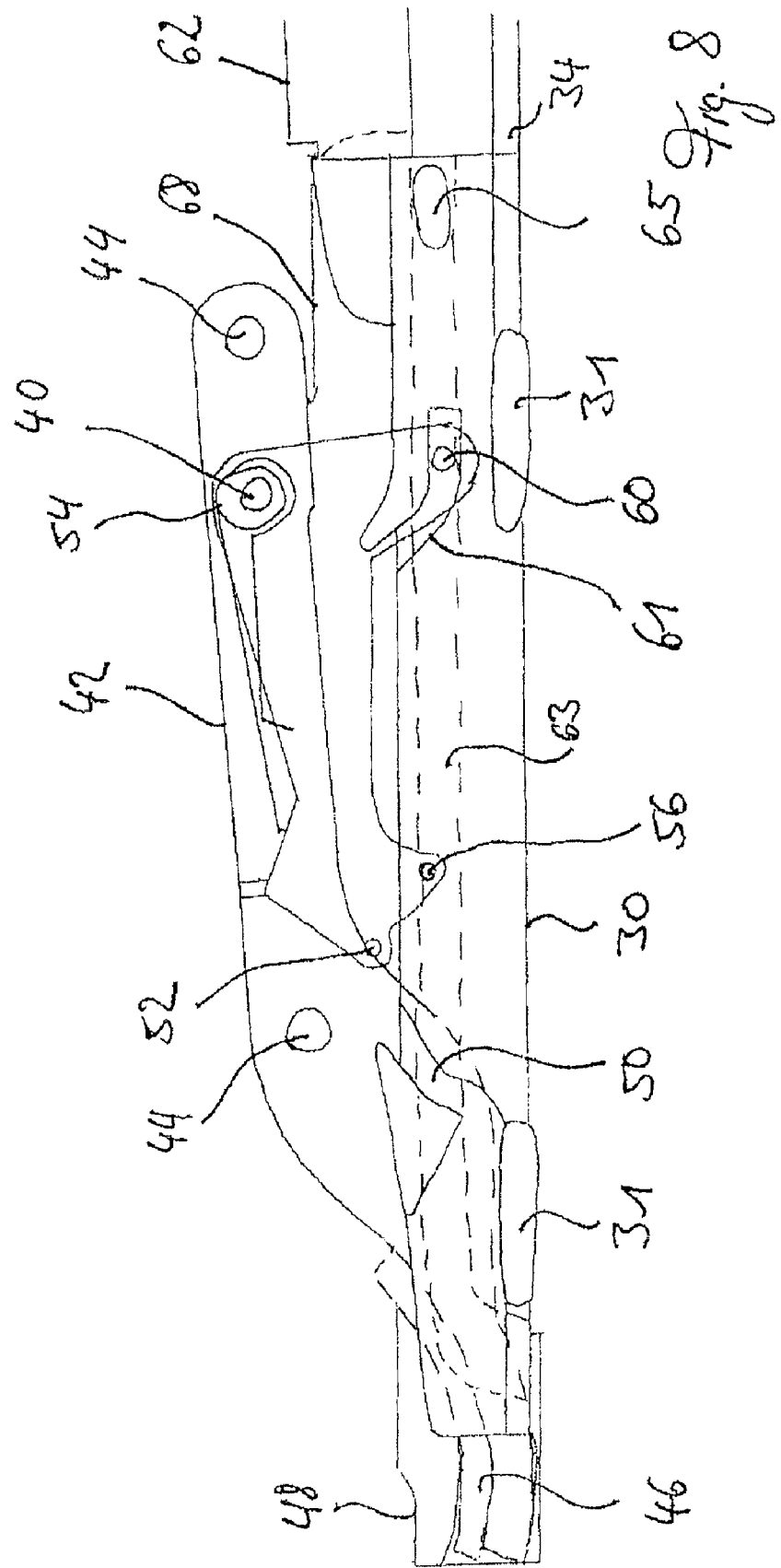
FIG. 8 shows a side view of a front section of the actuating mechanism in the cover element position illustrated in FIG. 1.
Figure 9:
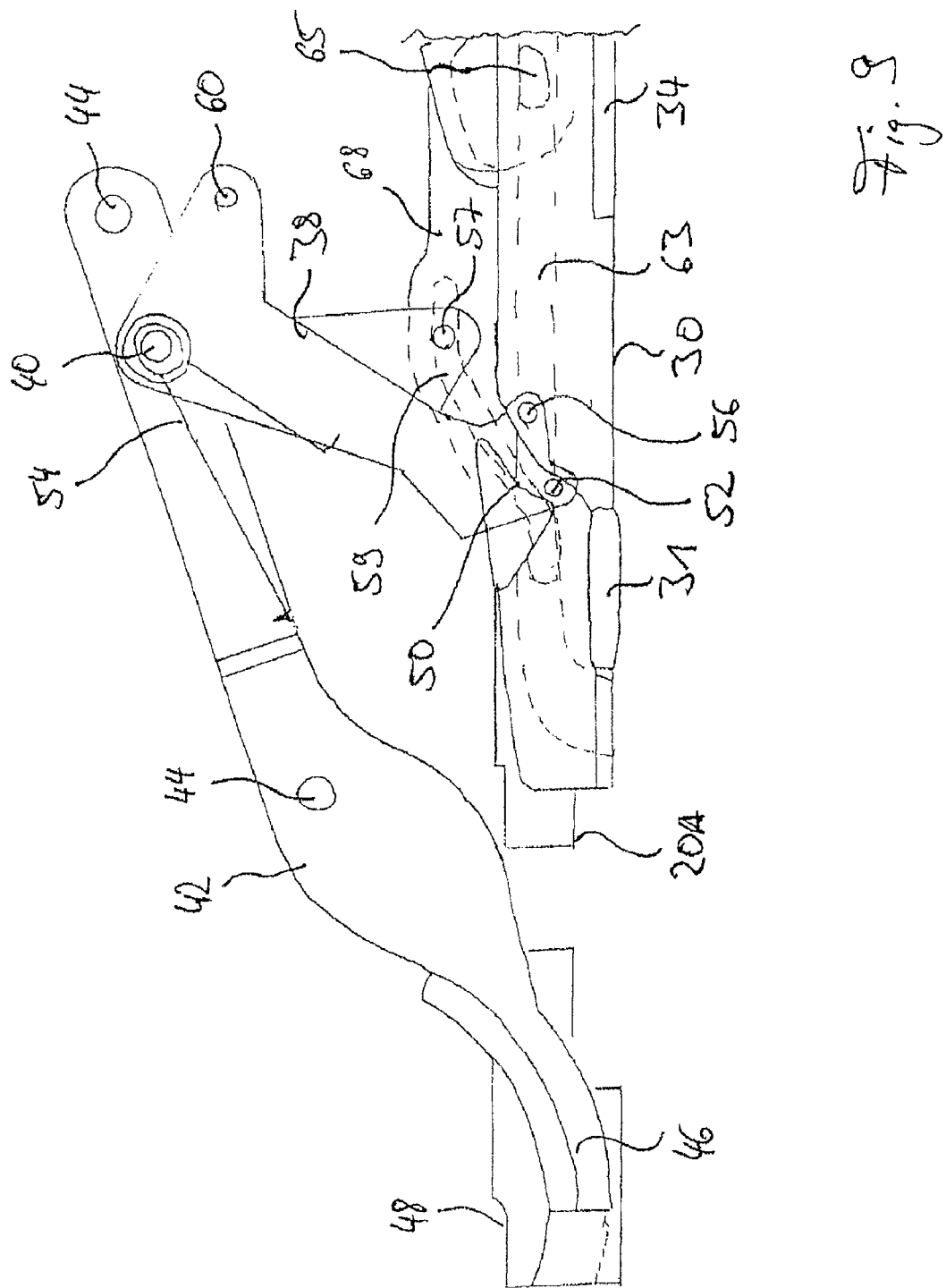
FIG. 9 shows a side view of the front section of the actuating mechanism in the cover element position illustrated in FIG. 2.
Figure 10:
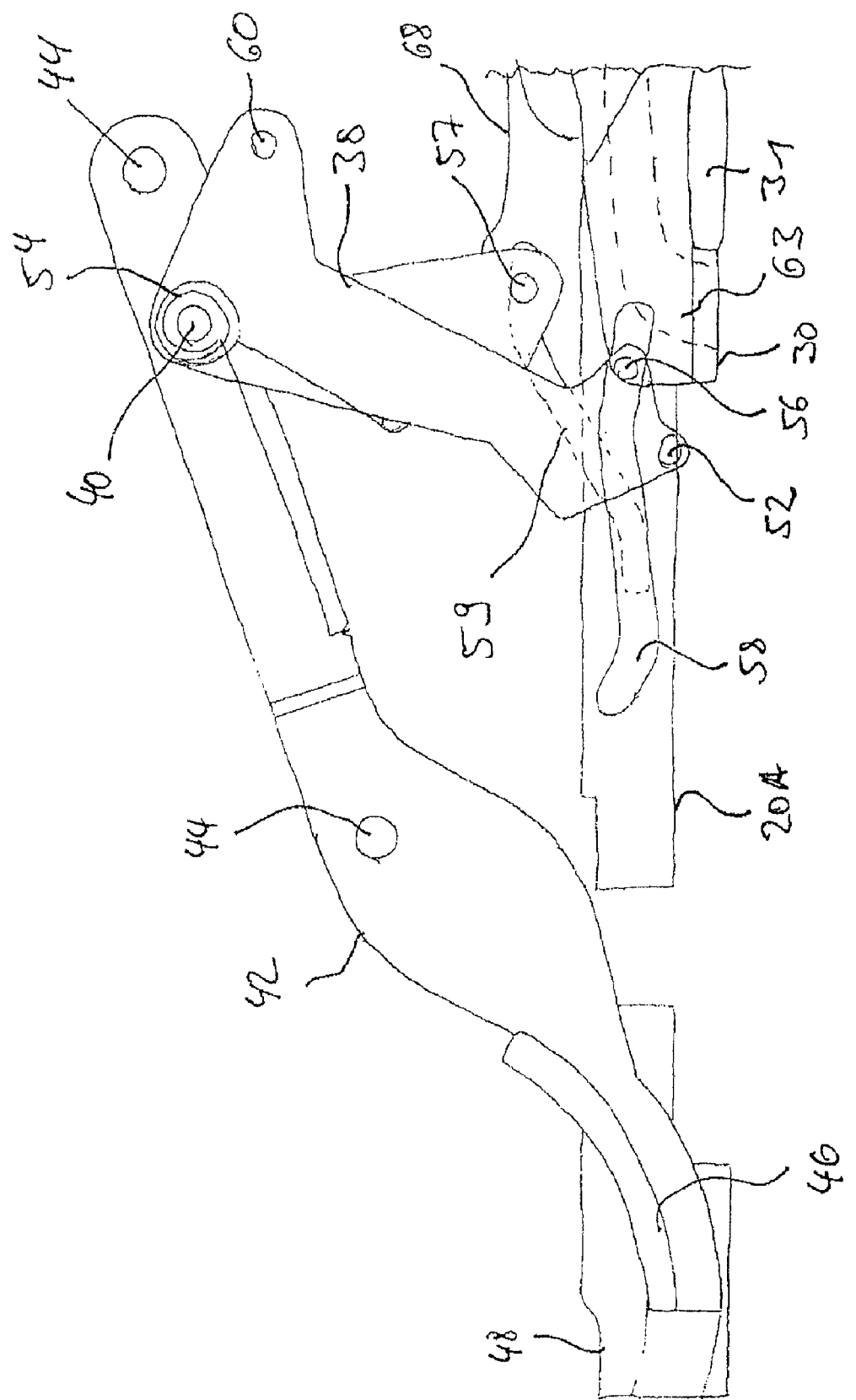
FIG. 10 shows a side view of the front section of the actuating mechanism in the cover element position illustrated in FIG. 3.
Figure 11:
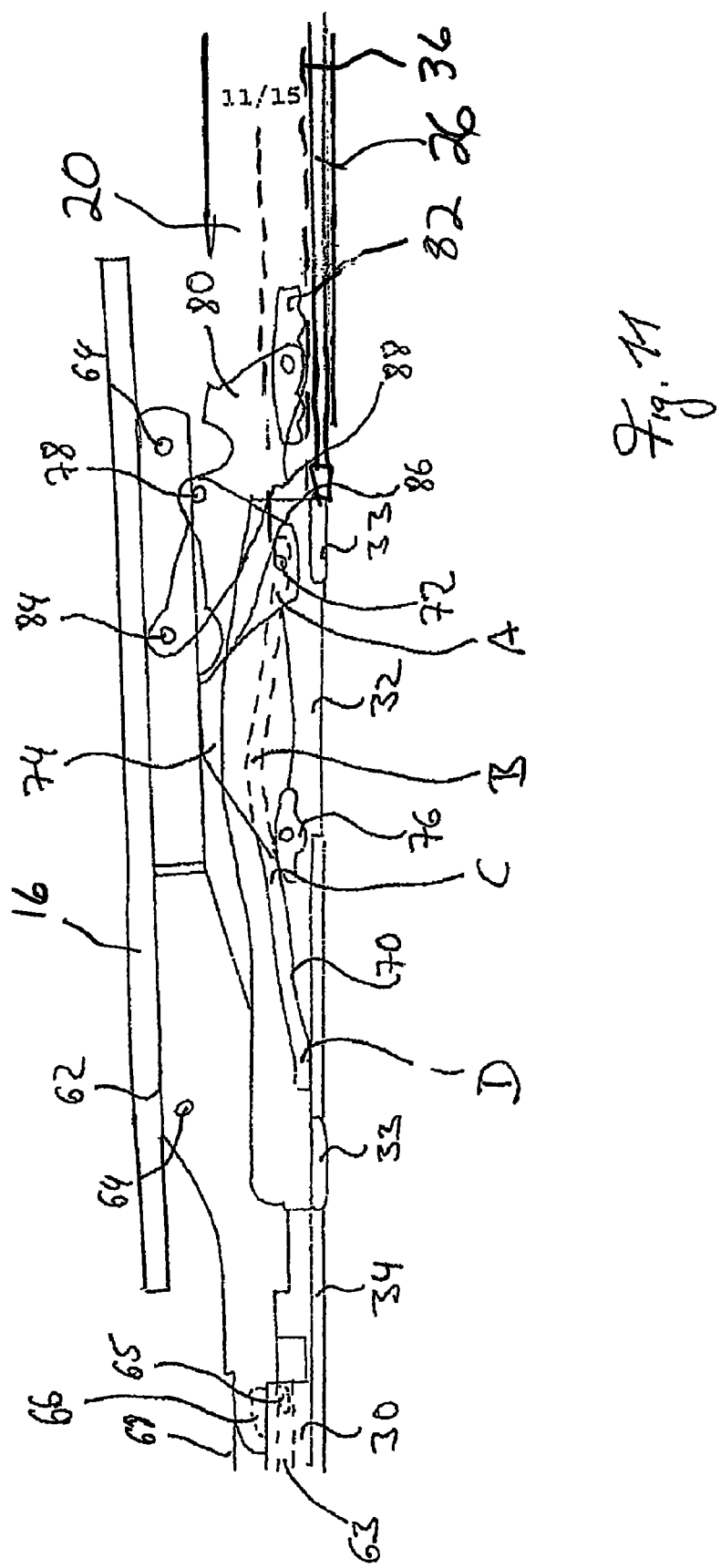
FIG. 11 shows a side view of a rear section of the actuating mechanism in the cover element position illustrated in FIG. 1.
Figure 12:
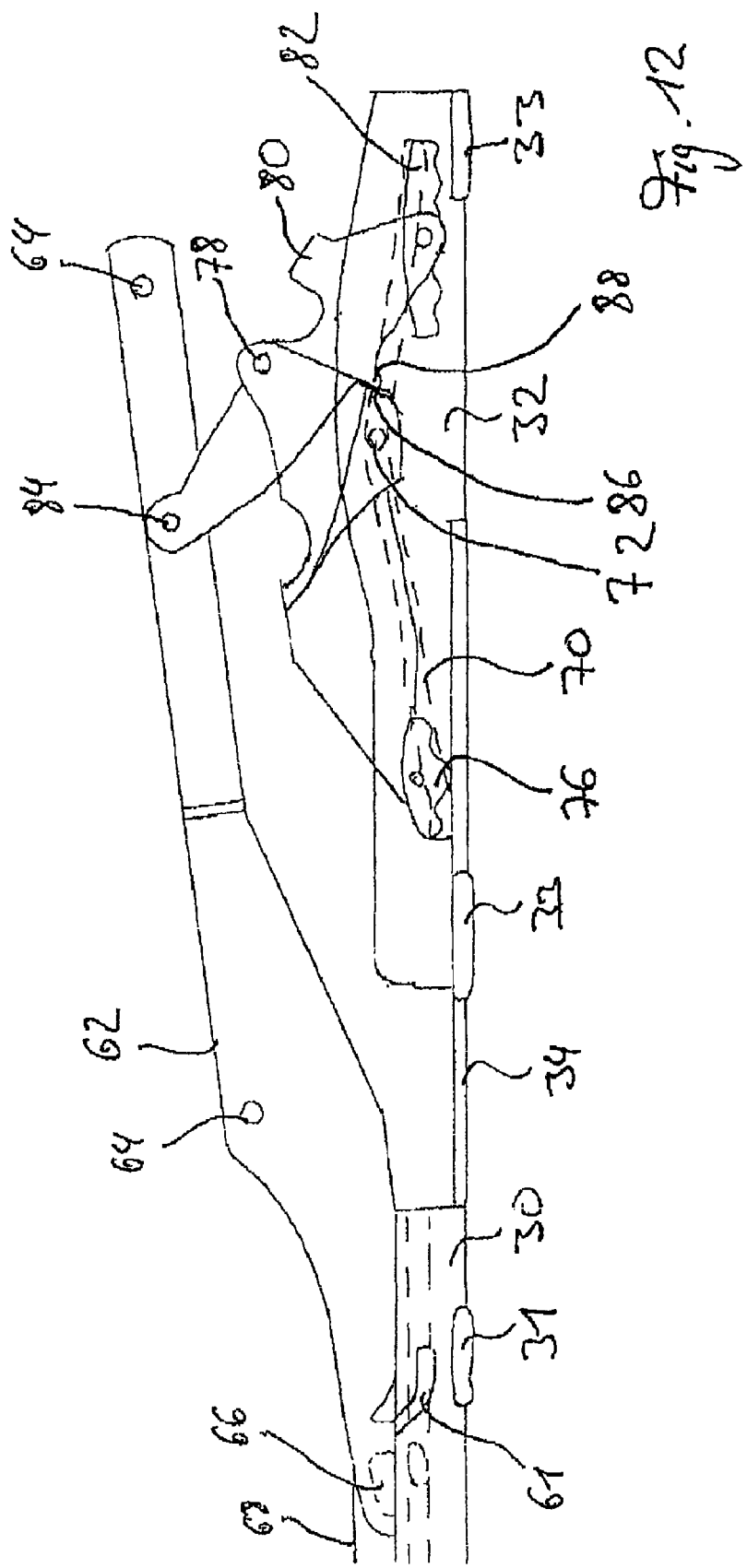
FIG. 12 shows a side view of the rear section of the actuating mechanism in the cover element position illustrated in FIG. 2.
Figure 13:
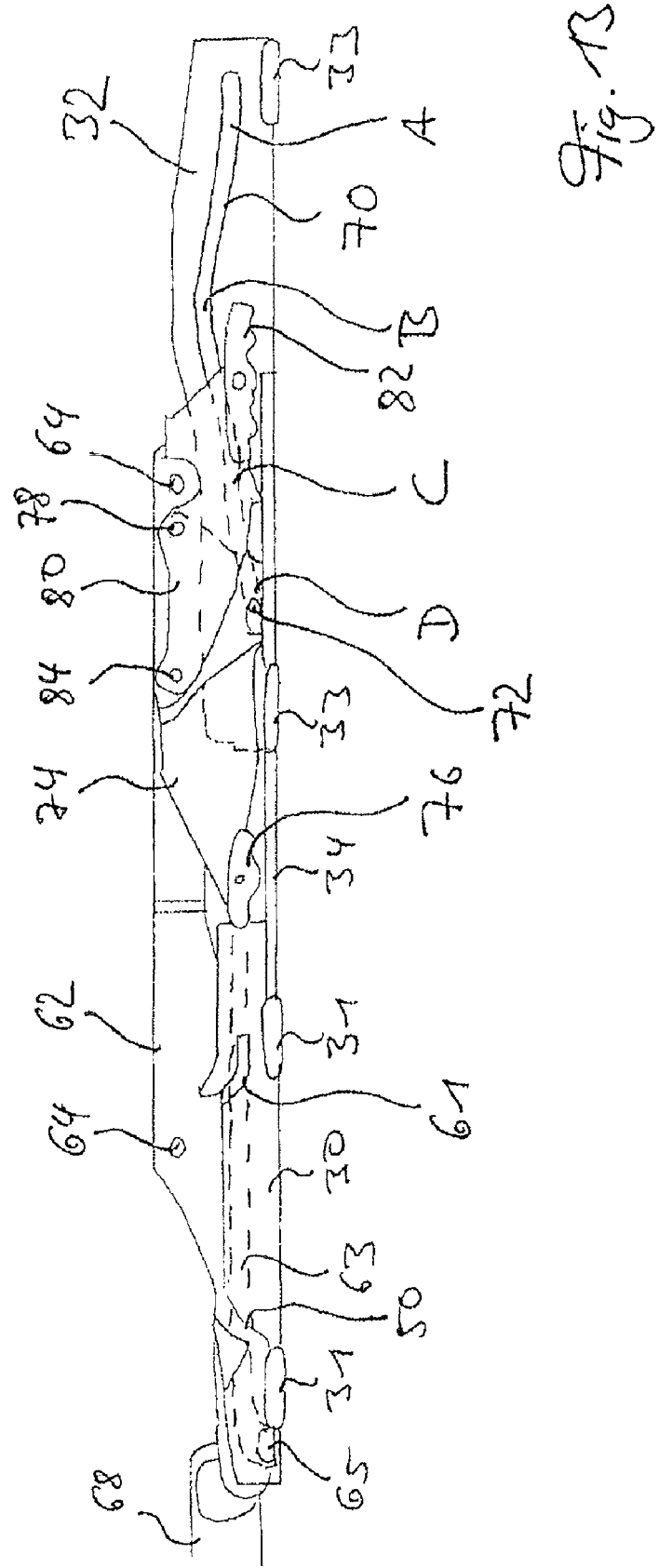
FIG. 13 shows a side view of the rear section of the actuating mechanism in the cover element position illustrated in FIG. 4.

The actuating and driving mechanism 28 comprises a front driving slide 30, illustrated in particular in FIGS. 8 to 10, and a rear driving slide 32, illustrated in particular in FIGS. 11 to 13, said driving slides forming a slide unit and, for this purpose, being connected to each other via a driving cable plate 34 which, in turn, is connected to the driving cable 26B.

The driving cable plate 34 has an essentially cylindrical guide section 36 which is essentially aligned with the driving cable 26B and is guided in a guide channel of the guide rail 20B, the guide channel also serving to guide the driving cable 26B.

The front driving slide 30, which is guided in the guide rail 20A via sliding elements, is assigned to the front cover element 14 and serves essentially in order to deploy the front cover element and to bring it back again into the closed position. For this purpose, the front driving slide 30 acts on a deployment lever 38 which is of essentially inverted U-shaped design and is connected via an articulation spindle 40 to a support 42, which is mounted pivotably at its front end, for the front cover element 14. For the fixing of the front cover element 14, the support 42 has two holes 44 oriented in the transverse direction of the vehicle.

For the pivotable mounting, the support 42 is provided at its front end with a "rotary bearing tongue" 46 which is encapsulated with plastic by injection molding and is guided in guide devices 48 fixed on the guide rails.

As can be seen in particular from FIGS. 8 to 10, the front driving slide 30 has a slotted guide track or control track 50 which interacts with a peg 52 of the deployment lever 38. The control track 50 has a profile which rises in the direction of the vehicle rear.

Figure 6:
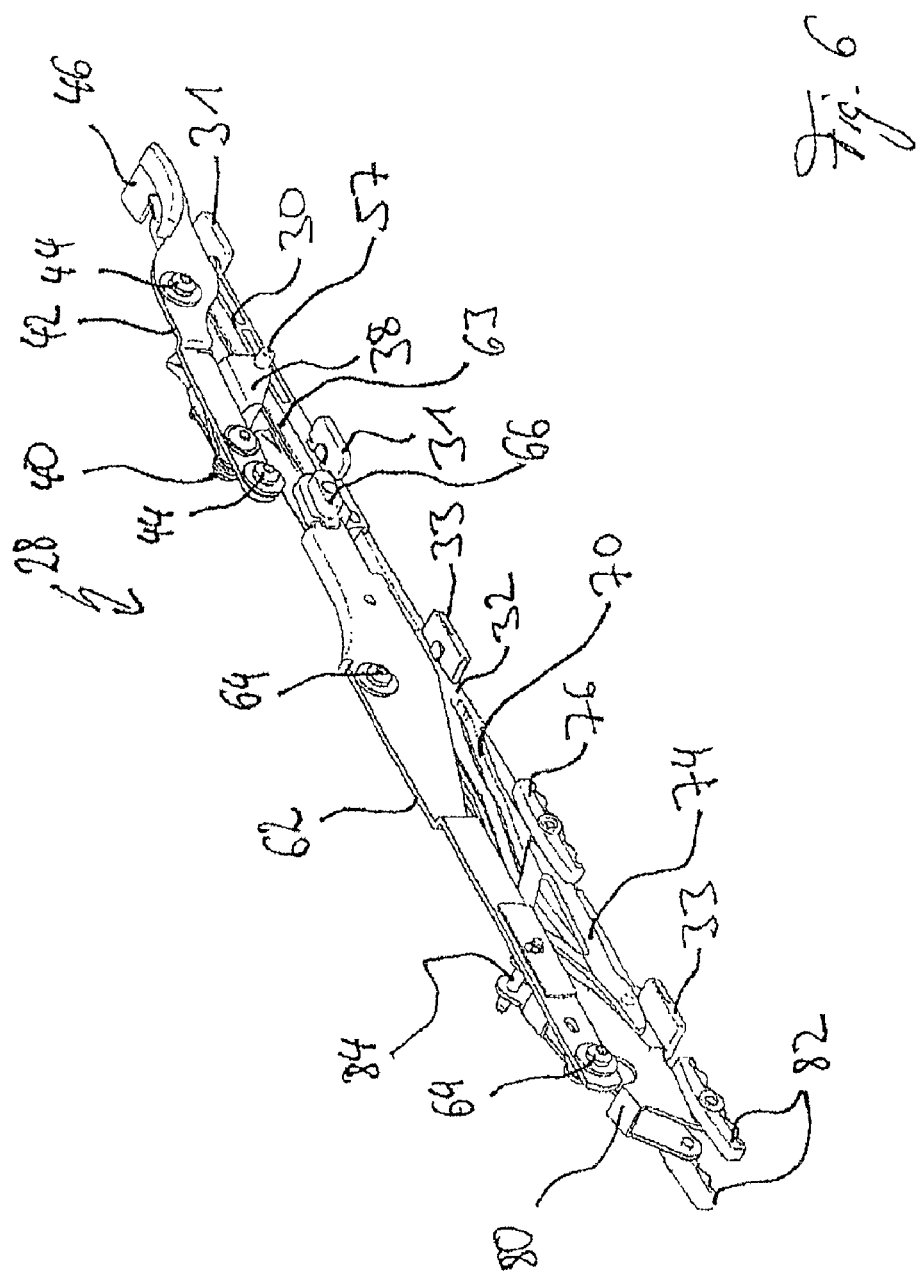
FIG. 6 shows an actuating mechanism for the two cover elements, which mechanism is assigned to a guide rail which is on the left in the direction of travel, in a perspective illustration.
Figure 7:
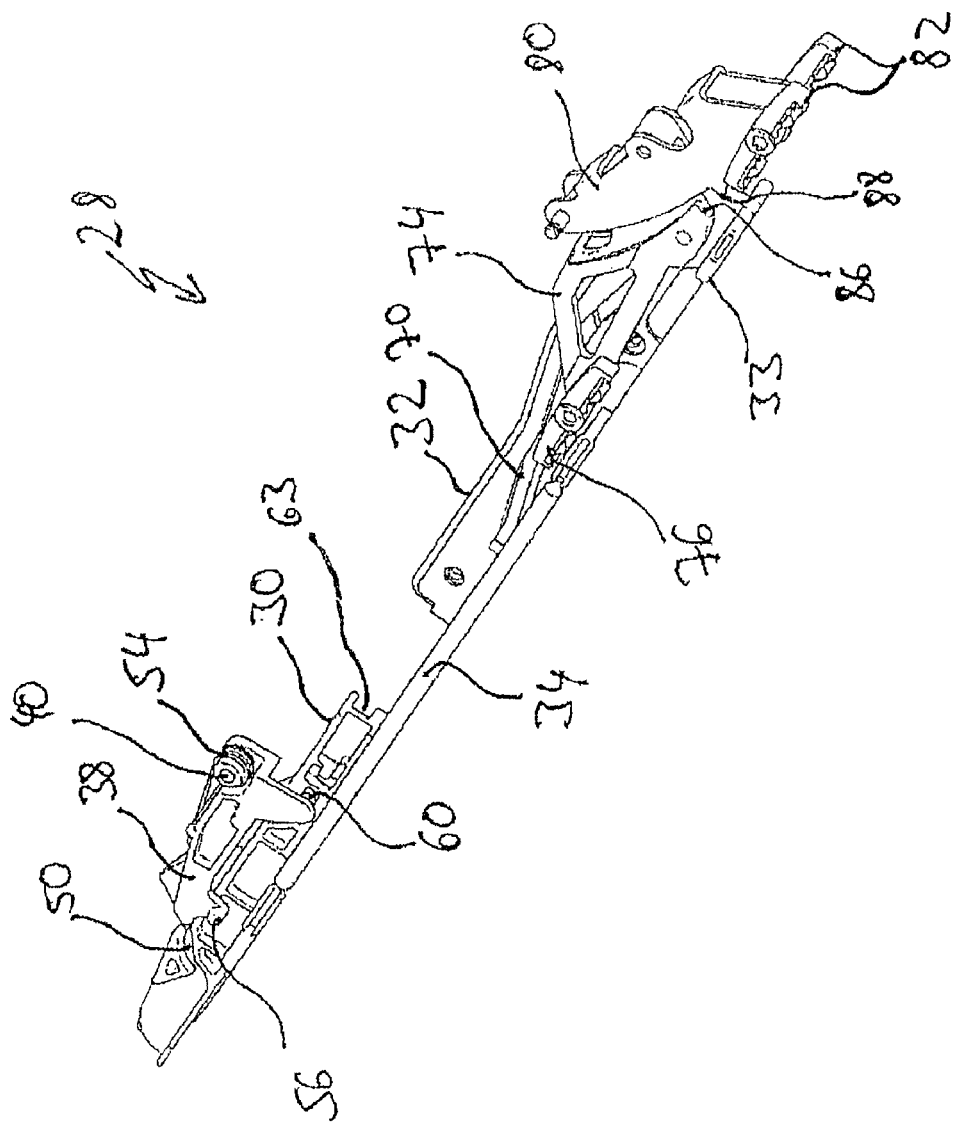
FIG. 7 shows a further perspective illustration of the actuating mechanism illustrated in FIG. 6.

In the arrangement of the actuating mechanism 28 that is illustrated in FIGS. 6 to 8, the front cover element 14 is closed, i.e. the support 42 of the front cover element 14 is in a lowered position. In this position of the support 42, the deployment lever 38 is also in an essentially horizontal arrangement. If the slide unit and therefore the front driving slide 30 are now moved to the rear, i.e. to the right in FIG. 8, the peg 52 of the deployment lever 38 undergoes a displacement in the control track 50, which triggers a deployment movement of the deployment lever 38, as a result of which, in turn, the support 42 and therefore the front cover element 14 are deployed. In this case, an extension of the support 42 and of the deployment lever 38 takes place, as can be gathered from FIG. 9.

The deployment movement is assisted by a spiral spring 54 which is mounted in the region of the articulation spindle 40 and engages around a bearing peg of the deployment lever 38, which bearing peg defines the articulation spindle 40, and has two legs, of which one acts on the support 42 and the other acts on the deployment lever 38, with the ends of the legs each being able to engage in a groove of the support 42 or of the deployment lever. The spiral spring 54 assists the expansion of the support 42 and of the deployment lever 38 and secures the deployed arrangement of the front cover element 14.

Furthermore, the deployment lever 38 comprises guide pegs 56 and 57 which protrude on both sides in the transverse direction of the vehicle, are respectively guided in a guide track 58 and 59 fixed on the guide rails and counter a tilting of the deployment lever 38 during the pivoting movement thereof.

To secure the closed position of the cover element 14, a securing pin 60 is formed on the deployment lever 38, the securing pin, in the arrangement illustrated in FIG. 8, engaging in a recess 61 on the upper side of the front driving slide 30 and bearing here against an upper wall of the front driving slide 30. In addition, the front cover element 14 can be offset slightly in the direction of the vehicle rear by means of the securing pin 60 for opening purposes, and therefore no collision takes place between the front cover element 14 and the front border of the roof opening 12 during the pivoting-up operation. This is achieved by the front driving slide 28, as it moves back in the guide rail 20A, pulling on the securing pin 60 and therefore exerting a force which is directed in the direction of the vehicle rear on the deployment lever 38 and the support 42. Only subsequently does the interaction of the control track 50 and of the peg 52 bring about a deployment of the deployment lever 38.

The rear driving slide 32, which is illustrated in particular in FIGS. 11 to 13, is guided displaceably in the longitudinal direction of the vehicle in guide tracks of the guide rail 20B via sliding elements 33, in a manner corresponding to the front driving slide 30, and serves to adjust the rear cover element 16 which is fixed on both sides to a support 62 which extends in the longitudinal direction of the vehicle and is provided for this purpose with two fixing holes 64.

At its front end, the support 62 has a pivot peg 66 which forms a pivot axis of the support 62. In the arrangement illustrated in FIG. 11, the pivot peg 66 is mounted in a raised position in a guide rail insert 68, which is manufactured from plastic, in such a manner that a longitudinal displacement of the support 62 along the guide rail 20B is blocked.

To lower the front end of the support 62, a control track 63 is provided on the front driving slide 30 and a peg 65 which protrudes in the transverse direction of the vehicle and is arranged on that side of the support 62 which faces away from the pivot peg 66 engages in said control track. In the lowered state, illustrated in FIG. 13, of the front end of the support 62, the peg 66 can be displaced in a guide track of the guide rail 20B.

The guide track 58 for the stabilizing peg 56 of the front deployment lever 38 is also formed in the guide rail insert 68 for mounting the peg 66 of the rear support 62.

The rear driving slide 32 furthermore has a control track 70 in which a bolt 72 of a "lifting and lowering lever" 74 for the rear support 62 is guided and which comprises a rear, first section A, a second section B which is higher than the first section A, a third section C which is level with the first section A, and a front, fourth section which is lower than the sections A, B and C. The arrangement of the sections A to D refers to the customary orientation of a vehicle.

The lifting and lowering lever 74 has an essentially inverted U-shaped cross section. The rear driving slide 32 can be displaced in the longitudinal direction of the vehicle between the two limbs of the lifting and lowering lever 74. At its front end, the lifting and lowering lever 74 is mounted rotatably on both sides on sliding elements 76 which are guided displaceably in guide tracks in the guide rail 20B. At its end facing away from the sliding elements 76, the lifting and lowering lever 74 is coupled via a bolt 78 in the central region of a "reinforcing lever" 80 which is mounted rotatably at its rear end on sliding elements 82 guided in a guide track of the guide rail 20B. At its end facing away from the sliding elements 82, the reinforcing lever 80 is coupled via a bolt 84 to the support 62 of the rear cover element 16. The reinforcing lever 80 causes the movement of the lifting and lowering lever 74, which movement takes place because of the action of the driving slide 32, to be transmitted to the support 62 and therefore to the rear cover element 16 in a reinforced form.

To limit the deployment movement of the support 62, a stop 86 which interacts with a projection 88 of the reinforcing lever 80 is formed on the lifting and lowering lever 74.

The actuating mechanism 28 operates in the manner described below.

Starting from the arrangement which is illustrated in FIG. 1 and in which the two cover elements 14 and 16 are closed, the slide unit, which is formed from the driving slides 30 and 32 and via the driving cable plate 34, is moved in the direction of the vehicle rear in the guide rail 20B. In the process, first of all the front cover element 14 undergoes, as described above, a slight offset in the direction of the vehicle rear because of the force acting on the securing pin 60 from the front driving slide 30.

A further displacement of the slide unit causes both the front cover element 14 and the rear cover element 16 to be deployed. This takes place by the deployment lever 38, which is connected to the front support 42, undergoing a deployment movement because of the effect of the control track 50, and the peg 72 of the lifting and lowering lever 74 for the rear support 62 being brought into the raised section B of the control track 70 such that the lifting and lowering lever 74 and therefore, via the reinforcing lever 80, the rear support 62 are pivoted out. The pivot axis of the rear support 62 is formed here by the pivot peg 66 at its front end.

A further displacement of the slide unit causes the rear cover element 16 to be pivoted back into the closed position. The peg 72 is then in section C of the control track 70. A further displacement of the driving slides 30 and 32 causes, firstly, because of the slotted guide track 63, which is assigned to the rear support 62, in the front slide 30, the front end of the rear support 62 to be lowered and, because of the effect of the control track 70 of the rear driving slide 32, causes the lifting and lowering lever 74 and therefore, via the reinforcing lever 80, the rear support 62 to undergo lowering. The peg 72 of the lifting and lowering lever 74 is then in the section D of the control track 70. The lowering of the support 62 takes place in such a manner that the rear cover element is arranged below the rear roof skin region 18 and can be displaced under the latter. The displacement of the rear cover element 16 is caused by a further displacement of the slide unit 33 which then acts on the lifting and lowering lever 74, and the support 62 and the assembly comprising slide unit, lifting and lowering lever 74, reinforcing lever 80, support 62 and associated rear cover element 16 are displaced under the rear roof skin region 18.

FIGS. 14 and 15 illustrate an alternative embodiment of an actuating mechanism 28 which can be used for driving the two cover elements 14 and 16 in the manner described in conjunction with the exemplary embodiment according to FIGS. 6 to 13. According to this first embodiment, the actuating mechanism 28 illustrated in FIGS. 14 and 15 comprises a slide unit which comprises a front driving slide 30 and a rear driving slide 32 and is provided with a driving cable plate 34 to which the driving cable (not illustrated specifically here) is fastened.

The front driving slide 30 which acts on the front cover element 14 likewise serves to deploy said cover element and to bring it back again to the closed position. According to the first embodiment, the front driving slide 30 acts on a deployment lever 38 which is connected via an articulation spindle 40 to a support 42, which is mounted pivotably at its front end, for the front cover element 14. The fixing of the cover element 14 to the support 42 takes place via two holes 44. At its front end, the support 42 is likewise provided with a rotary bearing tongue 46.

The deployment of the deployment lever 38 and of the front cover element 14 takes place in the manner described in conjunction with the first embodiment and with corresponding means, with the deployment movement likewise being assisted by a spiral spring 54 which is mounted in the region of the articulation spindle 40 and has two legs, of which one acts on the support 42 and the other acts on the deployment lever 38. The spiral spring 54 therefore assists the expansion of the support 42 and of the deployment lever 38 and secures the deployed arrangement of the front cover element 14.

The rear driving slide 32, which is guided displaceably in the longitudinal direction of the vehicle in guide tracks of the relevant guide rail via sliding elements 33, serves to adjust the rear cover element 16 which is fixed on both sides to a support 62 which extends in the longitudinal direction of the vehicle and is provided for this purpose with two fixing holes 64.

The mounting of the support 62 at its front end corresponds to that of the support 62 of the first embodiment.

By contrast, this embodiment differs from the first embodiment in that a control track 70 is formed on the driving slide 32 and, on the upper side of a T-shaped section of the driving slide 32, is designed in the form of a widened guide strip on which a lifting and lowering lever 74 is guided via a guide claw 90 which is designed as a beveled edge of the lifting and lowering lever 74 and engages under the guide strip.

The control track 70 is therefore formed on the upper side of the rear driving slide 32 and not, as in the first embodiment, in the form of a slot or a recess.

The lifting and lowering lever 74 is guided at its lower and rear end in a guide track of the relevant guide rail via sliding elements 76 and, at its end which faces away from the sliding elements 82, is mounted rotatably on the support 62 via a bolt 84. The lifting and lowering lever 74 consequently acts directly on the support 62. An embodiment of this type is distinguished by a high degree of rigidity and provides the rear cover element 16 with a particularly stable mounting. Unlike in the embodiment according to FIGS. 6 to 13, the formation of a reinforcing lever has been omitted.

The sequence of movement of the rear cover element 16 that is predetermined by the control track 70, which runs essentially in a manner corresponding to the control track of the first embodiment, is likewise such that, starting from a closed position, a displacement of the slide unit in the direction of the vehicle rear first of all causes the rear cover element 16 to be pivoted out, a further displacement of the slide unit in the same direction causes the rear cover element 16 to be pivoted back and lowered, and then causes the rear cover element 16 to be pulled back under a rear roof skin section, with the front cover element 14 always remaining in a pivoted-out position when the rear cover element 16 is open.

The invention claimed is:

1. A vehicle roof with at least two cover elements which optionally close or at least partially open up a roof opening, of which a front cover element can be deployed with its rear edge above a fixed vehicle roof region and of which a rear cover element serves as a sliding cover, can be lowered under the fixed vehicle roof region and can be displaced along guide rails which are arranged on both sides of the roof opening and are fixed on the roof, and with an actuating mechanism for the two cover elements, characterized in that the actuating mechanism for each guide rail comprises a slide unit which comprises a respective control track for the front cover element and the rear cover element, the control tracks being designed in such a manner that, starting from a closed position of the two cover elements, a displacement of the slide units in the direction of the vehicle rear firstly causes the two cover elements to be pivoted out into a ventilation position, a further displacement of the slide units in the same direction causes the rear cover element to be pivoted back and lowered, and then causes the rear cover element to be pulled back under a rear roof skin section.

2. The vehicle roof of claim 1, characterized in that, for the pivoting of the rear cover element, the control track for the rear cover element interacts with a lifting and lowering lever which acts on the rear cover element.

3. The vehicle roof of claim 2, characterized in that the lifting and lowering lever for the rear cover element is guided pivotably with one end in a guide track of the relevant guide rail.

4. The vehicle roof of claim 2, characterized in that the lifting and lowering lever acts on a reinforcing lever which is guided pivotably with one end in a guide track of the relevant guide rail and acts on the rear cover element with its other end.

5. The vehicle roof of claim 4, characterized in that a stop for the reinforcing lever is formed on the lifting and lowering lever, and the stop limits the deployment movement of the rear cover element.

6. The vehicle roof of claim 1, characterized in that the slide unit comprises a front driving slide which interacts with the front cover element, and a rear driving slide which interacts with the rear cover element.

7. The vehicle roof of claim 6, characterized in that the two driving slides are connected to each other via a driving cable plate on which a compression-resistant driving cable is fixed and which is provided with a guide section which is mounted displaceably in a guide track of the associated guide rail.

8. The vehicle roof of claim 6, characterized in that the front driving slide has a slotted guide track for the lowering of a front end of a support of the rear cover element.

9. The vehicle roof of claim 8, characterized in that, for the pivoting operation, the support for the rear cover element is mounted at its front end via a pivot peg in a guide rail insert defining a pivot axis.

10. The vehicle roof of claim 9, characterized in that the guide rail insert has a guide track for a guide peg of a deployment lever of the front cover element.

* * * * *